United States Patent [19]

Marois

[11] Patent Number: 5,331,251
[45] Date of Patent: Jul. 19, 1994

[54] AUTOMATIC CORRECTOR OF HEADLIGHT ELEVATION DURING CHANGES IN THE ATTITUDE OF A VEHICLE

[75] Inventor: Paul Marois, Paris, France
[73] Assignee: Valeo Vision, Bobigny, France
[21] Appl. No.: 61,449
[22] Filed: May 14, 1993

[30] Foreign Application Priority Data

May 15, 1992 [FR] France ................................ 92 05929

[51] Int. Cl.[5] .............................................. B60Q 1/02
[52] U.S. Cl. ....................................... 315/82; 315/83; 315/81; 362/66
[58] Field of Search ................ 315/81, 82, 83; 362/61, 362/66, 418, 420; 307/10 R

[56] References Cited

U.S. PATENT DOCUMENTS 4,204,270  5/1980  Poirier d'Ange d'Orsay ... 315/82 X

FOREIGN PATENT DOCUMENTS 0186571  12/1985  European Pat. Off. .
2217944  8/1974  France .

Primary Examiner—Robert J. Pascal
Assistant Examiner—Haissa Philogene

[57] ABSTRACT

A device for automatically correcting the elevation angle of at least one vehicle headlight during changes in the attitude of said vehicle, the device being of the type comprising at least two lighting sensors integrated in the headlight and constrained to move therewith, the two sensors being disposed to detect the brightness of the road in the field of illumination of the headlight in two different directions at two predetermined angles relative to a reference direction of said headlight, an actuator suitable for varying the angle of inclination of the headlight relative to the vehicle, and processor means suitable for generating an actuator control signal as a function of the signals delivered by the sensors which are essentially proportional to the quantity of light that each of them receives. According to the invention, the processor means comprise gain servo-control means controlled by the signal provided by the first sensor, said gain servo-control means controlling the gain of a variable gain circuit receiving the signal from the second sensor, in such a manner that said gain increases with decreasing signal from the second sensor.

8 Claims, 1 Drawing Sheet

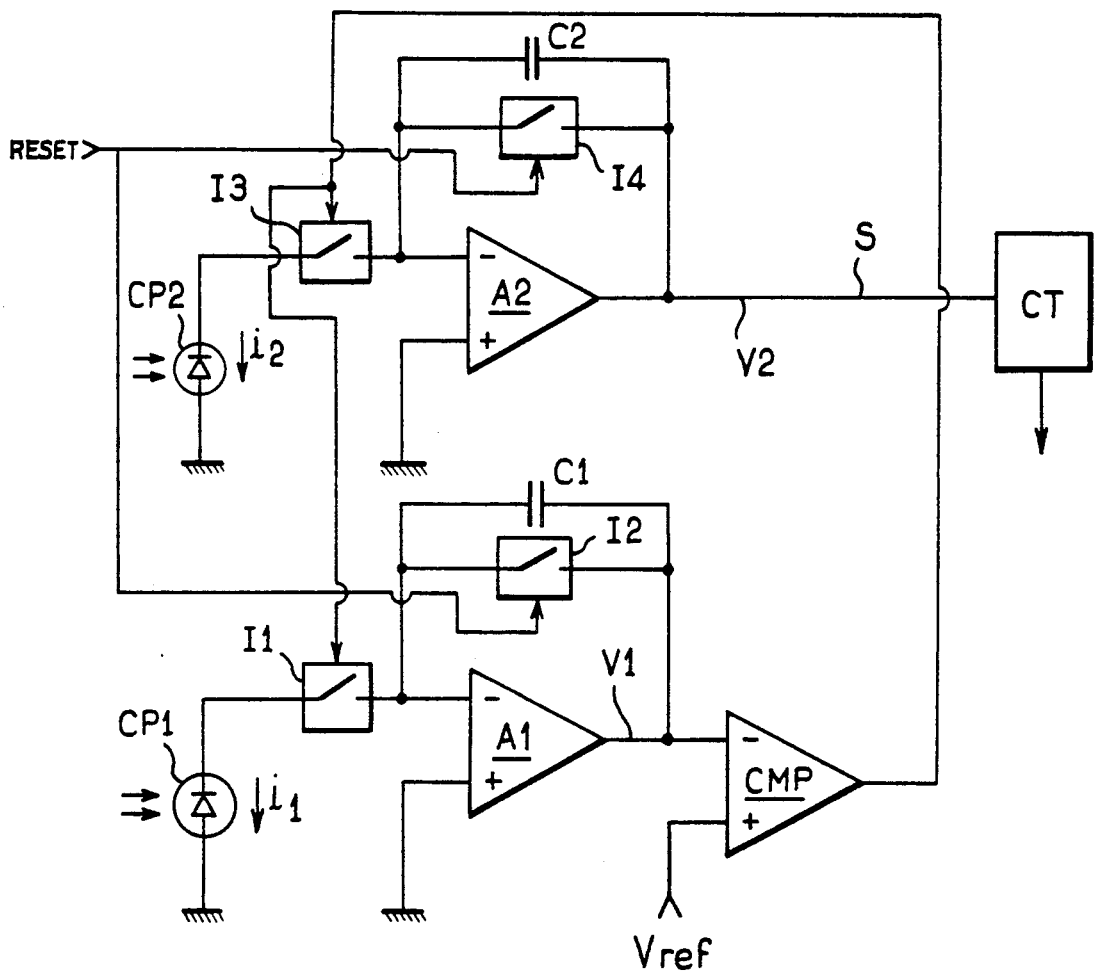

AUTOMATIC CORRECTOR OF HEADLIGHT ELEVATION DURING CHANGES IN THE ATTITUDE OF A VEHICLE

In general terms the present invention relates to devices for correcting the elevation angle of headlights of a motor vehicle, and it relates more particularly to an improved electronic corrector.

BACKGROUND OF THE INVENTION

Document U.S. Pat. No. 4,620,267 in the name of the Applicant discloses a correction device which is mainly constituted by at least two photoelectric cells secured to the reflector of a headlight, the cells looking at the road at two different distances ahead of the vehicle. The variations in the brightness of the road illuminated by the headlight in the two directions along which the respective cells look are used in processing means for the purpose of correcting the elevation of the headlights as a function of variations in the attitude of the vehicle. In one embodiment, the processing means mathematically divide values of the instantaneous currents passing through the cells, and the result of the division is compared with a threshold value.

Nevertheless, such a prior art device suffers from the drawback of being extremely sensitive to changes in the nature of the road surface, in the transparency of the headlight glass, in the feed voltage to the lamp, and also in weather conditions (rain that makes the road surface shiny, fog, etc.).

More precisely, the above parameters co-operate to impart random multiplying coefficients to the brightness as measured by each cell; in practice a prior art corrector as defined above works properly only under perfect conditions concerning road surface, glass cleanliness, weather, etc.

OBJECTS AND SUMMARY OF THE INVENTION

A main object of the present invention is to mitigate the above drawback.

To this end, the present invention provides a device for automatically correcting the elevation angle of at least one vehicle headlight during changes in the attitude of said vehicle, the device being of the type comprising at least two lighting sensors integrated in the headlight and constrained to move therewith, the two sensors being disposed to detect the brightness of the road in the field of illumination of the headlight in two different directions at two predetermined angles relative to a reference direction of said headlight, an actuator suitable for varying the angle of inclination of the headlight relative to the vehicle, and processor means suitable for generating an actuator control signal as a function of the signals delivered by the sensors which are essentially proportional to the quantity of light that each of them receives, wherein the processor means comprise gain servo-control means controlled by the signal provided by the first sensor, said gain servo-control means controlling the gain of a variable gain circuit receiving the signal from the second sensor, in such a manner that said gain increases with decreasing signal from the second sensor.

Preferably, the gain servo-control means comprise a first integrator circuit for integrating the signal provided by the first sensor, and comparator means for comparing the output voltage from the first integrator circuit with a reference voltage, wherein the circuit receiving the signal from the second sensor comprises a second integrator circuit, and wherein the output from said comparator means adjusts the integration time of the second integrator circuit.

In a variant, the reference voltage is capable of taking up different values associated with a plurality of pairs associating a headlight inclination angle with a value taken up by the output signal from the second integrator circuit when said headlight inclination angle is its real inclination angle.

In a particular embodiment, each integrator circuit includes reset means controlled by a reset input terminal of the device, and the integration time of the second integrator circuit is adjusted by using the comparator means to control switch means provided between the second sensor and the second integrator circuit.

The processor means may comprise means responsive to the signal provided by the circuit which receives the signal from the second sensor to determine an absolute inclination angle of the headlight.

Finally, in a variant embodiment, the processor means comprise means for causing the inclination angle of the headlight to scan, and means for determining the ratio between the slope of change in a signal provided by one of the sensors during said scanning and a value of said signal, together with means for deducing the angle of inclination of the headlight from said ratio.

BRIEF DESCRIPTION OF THE DRAWING

Other aspects, objects, and advantages of the present invention appear more clearly on reading the following detailed description of a preferred embodiment of the invention given by way of example and described with reference to the accompanying drawing in which the sole figure is a theoretical diagram of an electronic circuit constituting a portion of a correction device of the invention.

MORE DETAILED DESCRIPTION

For further details concerning the essential components of a correction device, reference may be made to document EP-A-0 186 571, the contents of which is incorporated into the present description by reference.

With reference to the drawing, a circuit is shown that comprises a first operational amplifier A1 having its inverting input connected to the current input terminal of a first photoelectric cell CP1 via a controlled switch I1. The photocell CP1 looks at the road in a first direction relative to a reference direction (optical axis) of an associated headlight. The current output terminal of the photocell CP1 is grounded. The non-inverting input of amplifier A1 is grounded, and a parallel-connected capacitor C1 and controlled switch I2 are connected between the inverting input of amplifier A1 and its output.

The output of A1 is connected to the negative input of a comparator CMP. The positive input of CMP is connected to a reference voltage marked Vref, which is either fixed or variable, as described below.

A second operational amplifier A2 is also provided having its inverting input connected via a controlled switch I3 to a current input terminal of a second photocell CP2 that looks at the road along a second direction that is different from the first, and in the present case that looks at a point on the road that is further away from the vehicle than the point looked at by the first photocell. The current output terminal of CP2 is grounded. The non-inverting input of A2 is grounded.

A parallel connection of a capacitor C2 and a controlled switch I4 is connected between the inverting input of A2 and its output. The output of A2 is also connected to the control output terminal S of the circuit.

The capacitors C1 and C2 preferably have the same capacitance.

The output of the circuit CMPT causes the switches I1 and I3 to switch between the open state and the closed state.

Finally, the circuit includes a reset input terminal which controls the switches I2 and I4 to take up the open or the closed state.

The output S connected to the output of A2 is applied to the input of a processor circuit CT that is not described in detail and that is capable in conventional manner of controlling the inclination of the headlights.

It is to be observed that the circuits built around A1 and A2 are integrator circuits for integrating the currents flowing through the photocells CP1 and CP2 respectively. These two integrators can be reset by closing the switches I2 and I4 using the reset input.

The basic operation of the above-described circuit is described below.

When the associated headlight is switched on and lights the road, each of the photocells CP1 and CP2 receives, via a suitable focusing system (lens or the like), a quantity of light that is proportional to the brightness of the road as seen in the direction along which it is looking.

Initially all the switches I1 to I4 are closed.

When the switches I2 and I4 are opened, by applying an appropriate control voltage on the reset input, then the output voltages V1 and V2 from A1 and A2 respectively increase, with their values being representative of the time integrals of the currents i1 and i2 respectively flowing through the cells CP1 and CP2, and thus of the quantity of light received.

When V1 reaches the reference value Vref, the output of CMP changes state and the switches I1 and I3 are opened, so as to simultaneously prevent the capacitors C1 and C2 charging, thereby having the effect of "freezing" the voltages V1 and V2.

The processor circuit CT provided downstream from the circuit shown in the figure then makes use of the voltage V2 present on the output S to deduce the angle of inclination $\alpha$ of the headlight and to correct the elevation angle of the headlights as a function of said angle $\alpha$.

After these operations, the switches I2 and I4 are closed again by the reset input and a new measurement cycle can begin.

It will be understood that the above circuit servo-controls the gain applied to road brightness measurement. More precisely, the lower the current i2, which may be due, for example, to the nature of the road surface, to attenuation of the received light by the headlight glass, or to a drop in the voltage fed to the lamp of the headlight, or to two or more of the above phenomena in combination, the longer the integration time, with said time being determined by the fixed value of Vref and by the mean value of i2.

This integration time is also longer for the circuit A2 (both integration times are identical), and thus the gain of the circuit A2 as determined by the ratio of V2 to the mean value of i2 is increased.

Conversely, when the value of i1 increases, then the gain of the circuit A2 decreases.

The invention thus makes it possible to modify the sensitivity of the measurement circuit as a function of external conditions, thereby making it independent of variations in said conditions and always retaining optimal dynamic range and signal-to-noise ratio.

It will be understood that the above circuit provides data on its output S from which the inclination of the headlight can be derived directly.

More precisely, in a given configuration, each of the currents i1 and i2 varies as a function of the inclination angle $\alpha$ of the headlight, in accordance with respective curves that can be assumed to be second degree equations in $\alpha$, said curves being written $k.i1(\alpha)$ and $k.i2(\alpha)$ where k is an attenuation constant for a given external environment.

The circuit described makes it possible to determine the inclination angle $\alpha$ of the headlight as follows: assume that the headlight is initially inclined at an angle $\alpha'$ and also assume that the angle $\alpha'$ does not change during the measurement time interval and that the currents i1 and i2 remain constant.

The circuit A1 then delivers a voltage V1 which is equal to $k.i1(\alpha').t$ where t is time.

When V1 reaches Vref, i.e. $k.i1(\alpha').t = Vref$, the integration time Ti is terminated, and is equal to $Vref/(k.i1(\alpha'))$.

The voltage V2 is then equal to $k.i2(\alpha').Ti$, i.e.:

$$V2 = Vref.(i2(\alpha')/i1(\alpha'))$$

Since this ratio between the currents i1 and i2 as a function of the angle $\alpha$ varies in one-to-one relationship with said angle $\alpha$, the voltage V2 can be used to obtain the angle $\alpha$, e.g. by appropriate processing in a microprocessor (either by performing mathematical operations, or by recalling a curve that has been stored point-by-point).

An advantage of the circuit of the present invention lies in that it is easily parameterized as a function of the environment of the corrector.

In particular, by adjusting the voltage Vref (which is easily done using a potentiometer or the like), it is possible to apply a multiplicative coefficient to the voltage V2 that is chosen in such a way as to compensate from one headlight to another for differences between the quantity of light received by the photocells, e.g. due to differences in attenuation through the glass, to differences in photocell sensitivity, etc.

Furthermore, the above-described circuit can be used while fixing a different value for Vref for each measurement of V2. Each of the successive values $Vref_i$ of Vref is associated (e.g. in a memory of the processor circuit CT) with a value $V_i$ that ought to be taken by the voltage V2 if the headlight has an angle of inclination $\alpha_i$. The various values $Vref_i$ are scanned successively until the value of V2 corresponds to a value $V_i$ that determines the present angle of inclination $\alpha_i$ of the headlight. Here again, the device is independent of changes in its environment while retaining maximum sensitivity.

Alternatively, the value $Vref_i$ corresponding to the angle of inclination $\alpha_i$ may be looked for by successive approximations.

In addition, automatic modification of the value of Vref can be envisaged for providing an overall change in the integration time Ti, and in particular for increasing said time when the state of the road is such that the quantity of light received varies extremely quickly. The circuits A1 and A2 then act to filter the signals provided by the two photocells, for the purpose of obtaining a series of measurements that are mutually compatible.

In another variant, a microprocessor incorporated in the corrector may compare each measurement of the effective voltage V2 with the integration time Ti since integration time is easily determined using a counter. Such a comparison makes it possible to ignore measured values that are not meaningful, in particular when an obstacle is present on the road and the current i2 increases suddenly.

In yet another variant, one of the two photocells CP1 and CP2, and preferably the photocell that looks at the portion of road that is closer to the vehicle, can be used for determining the inclination angle of the headlight using a different method. In particular, if the device for controlling the elevation angle of the headlight has a periodic control voltage applied thereto that causes its elevation direction to scan through a small amplitude, it is possible during such scanning to determine the slope P of the curve of the output voltage V from the corresponding operational amplifier. Said voltage is established with a fixed integration time so as to be proportional to the quantity of light actually received.

In which case, given that the curve of light received as a function of inclination angle $\alpha$ is a non-linear curve whose slope changes monotonically, the ratio P/V of said slope divided by said voltage makes it possible to determine the mean inclination angle $\alpha$ of the projector by implementing suitable processor means. It may be observed that the fact of dividing said slope P by the voltage makes the device insensitive to the nature of the ground and to the brightness of the light on the road at the looked at point.

Naturally, the present invention is not limited in any way to the embodiment described above and shown in the drawing, and the person skilled in the art is capable of applying variations or modifications within the ambit of the invention.

I claim:

1. A device for automatically correcting the elevation angle of at least one vehicle headlight during changes in the attitude of said vehicle, the device being of the type comprising at least two lighting sensors integrated in the headlight and constrained to move therewith, the two sensors being disposed to detect the brightness of the road in the field of illumination of the headlight in two different directions at two predetermined angles relative to a reference direction of said headlight, an actuator suitable for varying the angle of inclination of the headlight relative to the vehicle, and processor means suitable for generating an actuator control signal as a function of the signals delivered by the sensors which are essentially proportional to the quantity of light that each of them receives, wherein the processor means comprise gain servo-control means controlled by the signal provided by the first sensor, said gain servo-control means controlling the gain of a variable gain circuit receiving the signal from the second sensor, in such a manner that said gain increases with decreasing signal from the second sensor.

2. A device according to claim 1, wherein the gain servo-control means comprise a first integrator circuit for integrating the signal provided by the first sensor, and comparator means for comparing the output voltage from the first integrator circuit with a reference voltage, wherein the circuit receiving the signal from the second sensor comprises a second integrator circuit, and wherein the output from said comparator means adjusts the integration time of the second integrator circuit.

3. A device according to claim 2, wherein the reference voltage is adjustable.

4. A device according to claim 3, wherein the reference voltage is capable of taking up different values associated with a plurality of pairs associating a headlight inclination angle with a value taken up by the output signal from the second integrator circuit when said headlight inclination angle is its real inclination angle.

5. A device according to claim 2, wherein each integrator circuit includes reset means controlled by a reset input terminal of the device.

6. A device according to claim 2, wherein the integration time of the second integrator circuit is adjusted by using the comparator means to control switch means provided between the second sensor and the second integrator circuit.

7. A device according to claim 1, wherein the processor means further include means responsive to the signal provided by the circuit which receives the signal from the second sensor to determine an absolute inclination angle of the headlight.

8. A device according to claim 1, wherein the processor means comprise means for causing the inclination angle of the headlight to scan, and means for determining the ratio between the slope of change in a signal provided by one of the sensors during said scanning and a value of said signal, together with means for deducing the angle of inclination of the headlight from said ratio.

* * * * *